United States Patent
Takara et al.

(10) Patent No.: US 12,524,596 B2
(45) Date of Patent: Jan. 13, 2026

(54) CLOCK DOMAIN CROSSING VERIFICATION WITH SETUP ASSISTANCE

(71) Applicant: Siemens Industry Software Inc., Plano, TX (US)

(72) Inventors: Kurt Takara, Fremont, CA (US); Sulabh Kumar Khare, Noida (IN); Kaushal Viral Shah, Khamgaon (IN); Debraj Ganguly, Kadamtala (IN)

(73) Assignee: Siemens Industry Software Inc., Plano, TX (US)

( * ) Notice: Subject to any disclaimer, the term of this patent is extended or adjusted under 35 U.S.C. 154(b) by 703 days.

(21) Appl. No.: 17/900,508

(22) Filed: Aug. 31, 2022

(65) Prior Publication Data

US 2024/0070370 A1 Feb. 29, 2024

(51) Int. Cl.
*G06F 30/396* (2020.01)
*G06F 30/392* (2020.01)
*G06F 111/04* (2020.01)
*G06F 117/04* (2020.01)
*G06F 119/12* (2020.01)

(52) U.S. Cl.
CPC .......... *G06F 30/396* (2020.01); *G06F 30/392* (2020.01); *G06F 2111/04* (2020.01); *G06F 2117/04* (2020.01); *G06F 2119/12* (2020.01)

(58) Field of Classification Search
CPC .. G06F 30/396; G06F 30/392; G06F 2111/04; G06F 2117/04; G06F 2119/12; G06F 30/3312; G06F 30/3323; G06F 30/398
See application file for complete search history.

(56) References Cited

U.S. PATENT DOCUMENTS

| | | | | |
|---|---|---|---|---|
| 8,209,648 | B1* | 6/2012 | Ku | G06F 30/3312 716/108 |
| 8,631,364 | B1* | 1/2014 | Dobkin | G06F 30/34 716/108 |
| 10,204,201 | B1* | 2/2019 | Loh | G06F 30/33 |
| 10,935,595 | B1* | 3/2021 | Vimjam | G06F 30/33 |
| 2005/0273741 | A1* | 12/2005 | Lahner | G06F 30/30 716/108 |
| 2010/0242003 | A1* | 9/2010 | Kwok | G06F 30/30 716/106 |
| 2012/0151425 | A1* | 6/2012 | Appleton | G06F 30/3315 716/108 |

(Continued)

*Primary Examiner* — Nha T Nguyen

(57) ABSTRACT

A computing system can perform static verification operations on a circuit design with a first set of design constraints characterizing portions of an electronic device described by the circuit design and identify one or more violations associated with clock domain crossings in the circuit design. The computing system can analyze the circuit design and the first set of the design constraints to determine at least one of the violations associated with the clock domain crossings in the circuit design corresponds to the first set of the design constraints, and generate one or more additional design constraints to integrate into the first set of the design constraints based on the analysis of the circuit design and the first set of the design constraints. The computing system can re-perform the static verification operations on the circuit design based on a second set of the design constraints that includes the additional design constraints.

14 Claims, 6 Drawing Sheets

(56) References Cited

U.S. PATENT DOCUMENTS

| | | | |
|---|---|---|---|
| 2012/0180015 A1* | 7/2012 | Mneimneh | G06F 30/30 |
| | | | 716/113 |
| 2015/0026654 A1* | 1/2015 | Kwok | G06F 30/3323 |
| | | | 716/108 |
| 2015/0347652 A1* | 12/2015 | DiLullo | G06F 30/3312 |
| | | | 716/136 |
| 2016/0259879 A1* | 9/2016 | Ganai | G06F 30/398 |
| 2017/0091361 A1* | 3/2017 | Mautner | G06F 30/3312 |
| 2020/0257332 A1* | 8/2020 | Sawada | G06F 30/3312 |
| 2020/0401749 A1* | 12/2020 | Malani | G06F 30/3308 |
| 2021/0209279 A1* | 7/2021 | Malani | G06F 30/3308 |
| 2021/0350053 A1* | 11/2021 | Ahuja | G06F 30/327 |
| 2022/0327266 A1* | 10/2022 | Narwade | G06F 30/33 |
| 2022/0327269 A1* | 10/2022 | Seo | G06F 30/3312 |
| 2023/0205969 A1* | 6/2023 | Surendran | G06F 30/3312 |
| | | | 716/52 |
| 2023/0244841 A1* | 8/2023 | Surendran | G06F 30/396 |
| | | | 716/108 |

* cited by examiner

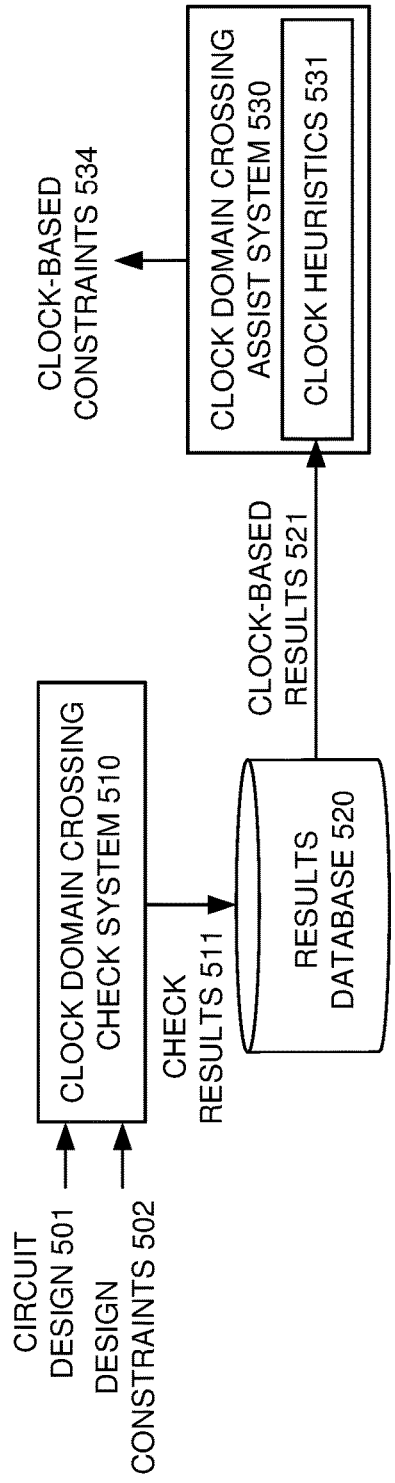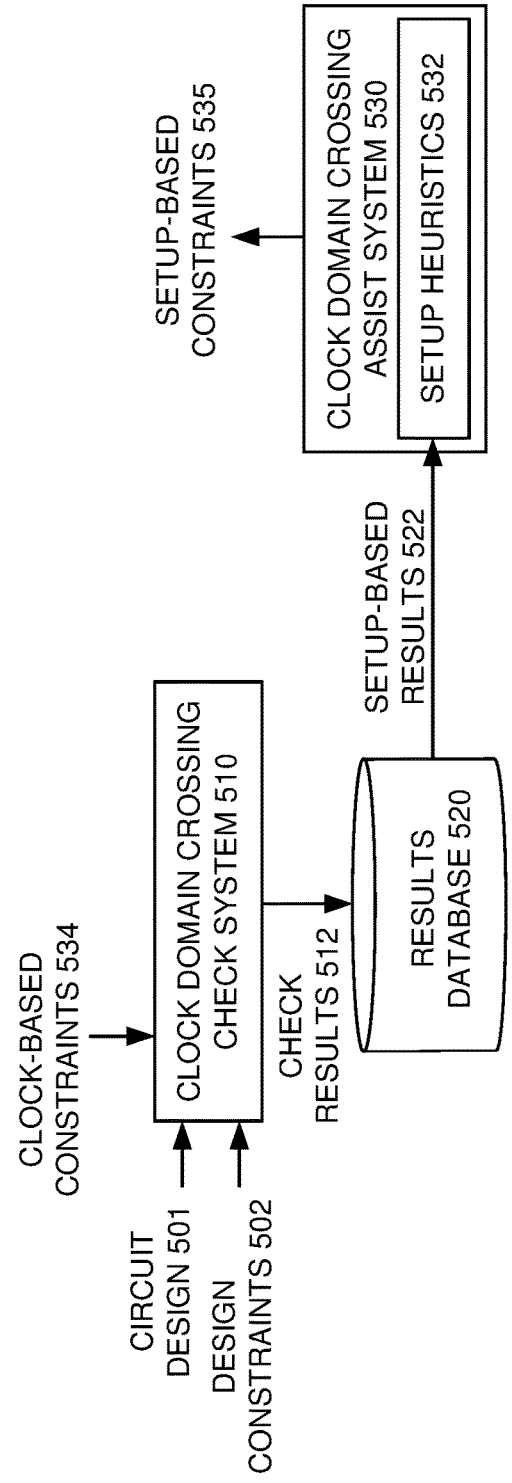
FIG. 5A
FIG. 5B

CLOCK DOMAIN CROSSING VERIFICATION WITH SETUP ASSISTANCE

TECHNICAL FIELD

This application is generally related to electronic design automation and, more specifically, to clock domain crossing verification of a circuit design with setup assistance.

BACKGROUND

Designing and fabricating electronic systems typically involves many steps, known as a "design flow." The particular steps of a design flow often are dependent upon the type of electronic system to be manufactured, its complexity, the design team, and the fabricator or foundry that will manufacture the electronic system from a design. Typically, software and hardware "tools" verify the design at various stages of the design flow by running simulators, hardware emulators, and/or formal techniques, and errors in the design are corrected or the design is otherwise improved.

Initially, a specification for a new electronic system can be transformed into a logical design, sometimes referred to as a register transfer level (RTL) description of the electronic system. With this logical design, the electronic system can be described in terms of both the exchange of signals between hardware registers and the logical operations that can be performed on those signals. The logical design typically employs a Hardware Description Language (HDL), such as System Verilog or Very high speed integrated circuit Hardware Description Language (VHDL).

The logic of the electronic system can be analyzed to confirm that it will accurately perform the functions desired for the electronic system, sometimes referred to as "functional verification." A design verification tool can perform functional verification operations, such as simulating, emulating, and/or formally verifying the logical design. Verification engineers have also performed static checks on the logical design to identify circuitry in the electronic system that that could introduce metastability at clock domain crossings, which could lead to functional failure of the electronic system. For example, a clock domain crossing path can correspond to a connection in the logical design between two registers having asynchronous clock signals. Due to the asynchronous nature of the clock signals, one of the registers can generate an asynchronous signal that can violate setup and hold requirements for the other register, causing the other register to enter a metastable state. To address these problems, synchronization structures, often called synchronizers, can be added to clock domain crossing paths in the logical design to prevent the propagation of metastable events to downstream logic. Each synchronizer can be dependent on a set of assumptions or protocols that when violated can cause data loss, data corruption, and/or metastability to propagate downstream.

As the electronic systems become larger and more complex, design verification tools that perform clock domain crossing checks on the corresponding logical designs tend to provide a large volume of results in analysis reports for designers to review. Since a majority of clock domain crossing violations have be found to be attributable either design errors or problems with setting-up the design verification tools to perform to clock domain crossing checks, verification engineers often manually analyze the analysis reports to determine whether the cause of each clock domain crossing violation was related to a design error and/or a setup problem before manually resolving them. Due to the large volume of results output from the design verification tool, attempts to manually resolve the clock domain crossing violations have been error-prone and consume a significant amount of time and effort.

SUMMARY

This application discloses a computing system implementing a design verification tool to perform one or more static checks on clock domain crossings in a circuit design. The design verification tool can perform static verification operations on the circuit design with a first set of design constraints characterizing portions of an electronic device described by the circuit design and identify one or more violations associated with clock domain crossings in the circuit design. The computing system can analyze the circuit design and the first set of the design constraints to determine at least one of the violations associated with the clock domain crossings in the circuit design corresponds to the first set of the design constraints, and generate one or more additional design constraints to integrate into the first set of the design constraints based on the analysis of the circuit design and the first set of the design constraints. The computing system can re-perform the static verification operations on the circuit design based on a second set of the design constraints that includes the additional design constraints.

In some embodiments, the static verification operations, analysis, and generation of the additional design constraints can be performed iteratively with differing heuristics applied at each stage. For example, the first stage can apply clock heuristics to analyze the circuit design and a set of the design constraints by grouping clock signals in the circuit design into multiple asynchronous clock groups, and then generating the one or more additional design constraints based on the asynchronous clock groups and the violations associated with the clock domain crossings in the circuit design.

The second stage can apply clock heuristics to analyze the circuit design and a set of the design constraints by grouping the clock domain crossings in the circuit design based on a commonality of transmission registers for the clock domain crossings, and generating the one or more additional design constraints based on a presence of synchronizing circuitry utilized in the clock domain crossings for the groups and the violations associated with the clock domain crossings in the circuit design. In some embodiments, the second stage also can consolidate the violations associated with at least one of the groups of the clock domain crossings into a single violation.

The third stage can apply clock heuristics to analyze the circuit design and a set of the design constraints by analyzing input signals received by a reception register of a clock domain crossing, and generating the one or more additional design constraints to report the input signals as a possible enable signal or to gray-code the input signals as a synchronized convergence. The third stage also can analyze combinational logic driving synchronization circuitry in the clock domain crossing paths, and generate the one or more additional design constraints based on which clock domain associated with the combinational logic. Embodiments will be described below in greater detail.

DESCRIPTION OF THE DRAWINGS

FIGS. 5A-5D illustrates an example iterative clock domain crossing verification process with violation-based constraints according to various embodiments.

DETAILED DESCRIPTION

Illustrative Operating Environment

Figure 1:
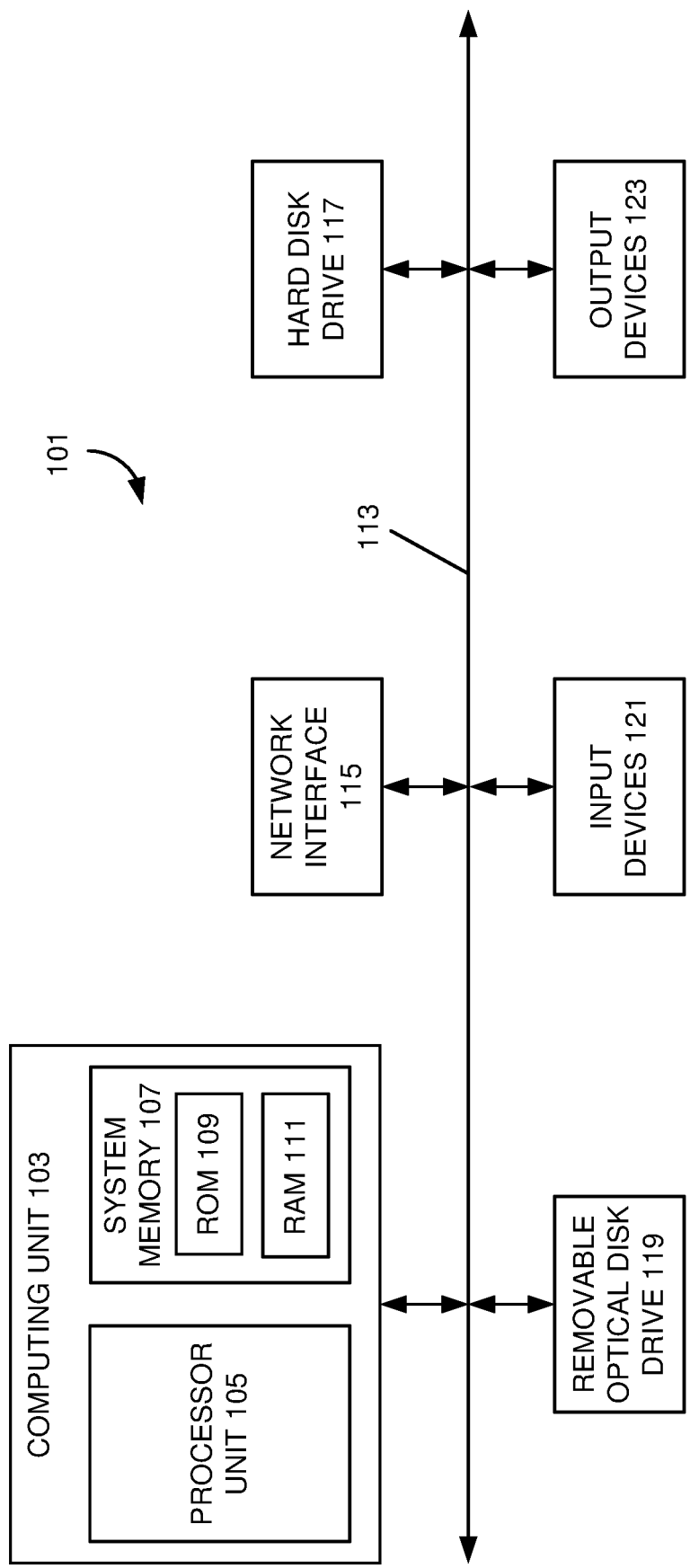
FIGS. 1 and 2 illustrate an example of a computer system of the type that may be used to implement various embodiments.

Various examples of the invention may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 117-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 117-123 may be internally housed with the computing unit 103. Alternately, one or more of the peripheral devices 117-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments of the invention may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
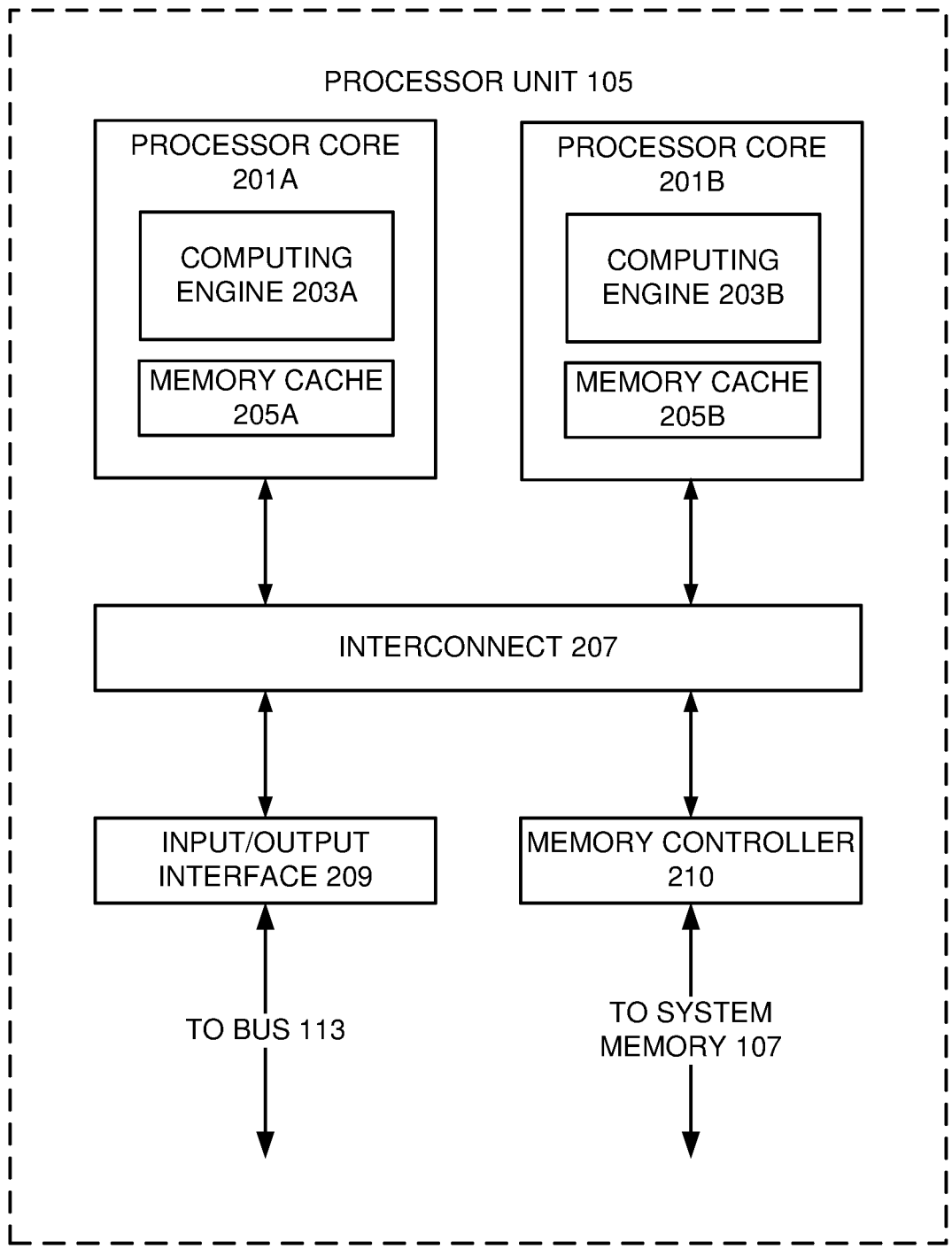

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, California, the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations of the invention, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments.

Clock Domain Crossing Verification With Setup Assistance

Figure 3:
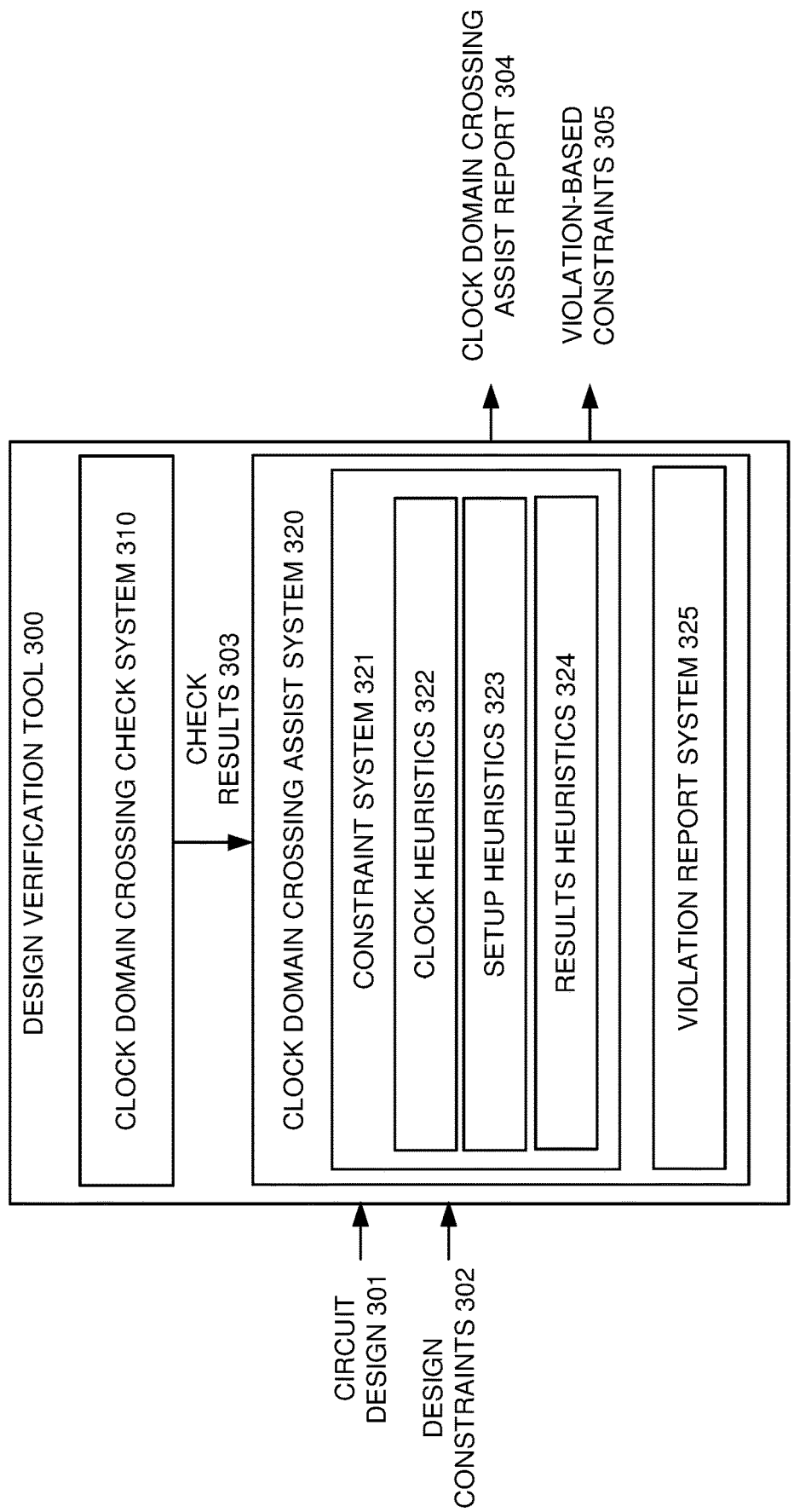
FIG. 3 illustrates an example of a design verification tool to perform clock domain crossing verification with setup assistance implemented according to various embodiments.
Figure 4:
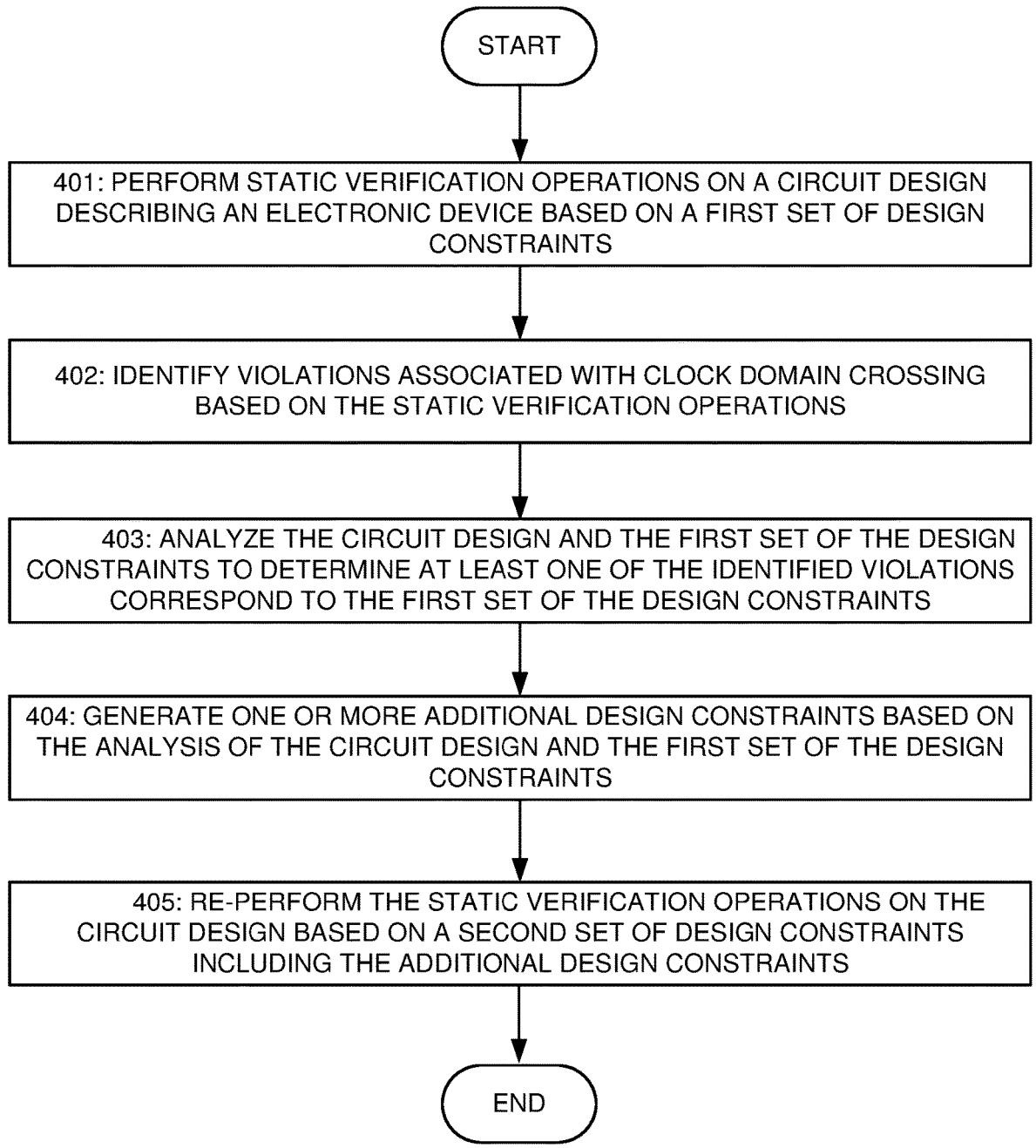
FIG. 4 illustrates a flowchart showing an example implementation of clock domain crossing verification with setup assistance according to various embodiments.

FIG. 3 illustrates an example of a design verification tool 300 to perform clock domain crossing verification with setup assistance implemented according to various embodiments. FIG. 4 illustrates a flowchart showing an example implementation of clock domain crossing verification with setup assistance according to various embodiments. Referring to FIGS. 3 and 4, the design verification tool 300 can receive a circuit design 301 describing an electronic device, for example, in terms of an exchange of data signals between components in the electronic device, such as hardware registers, flip-flops, combinational logic, or the like, and in terms of logical operations that can be performed on the data signals in the electronic device. The circuit design 301 can describe the electronic device at a register transfer level (RTL), for example, with code in a hardware description language (HDL), such as Verilog, Very high speed integrated circuit Hardware Description Language (VHDL), or the like. The design verification tool 300 also can receive design constraints 302, which can characterize portions of the circuit design 301. In some embodiments, the design constraints 302 can identify attributes of signals in the circuit design 301, group signals in the circuit design 301 together, associate signals in the circuit design 301 to clock domains or clock signals, or the like.

The design verification tool 300 can include a clock domain crossing check system 310 that, in a block 401, can perform static verification operations on the circuit design 301 based on the design constraints 302. In some embodiments, the static verification operations performed by the clock domain crossing check system 310 can include identifying clock domains and signal paths crossing between the identified clock domains, called clock domain crossings. For example, a clock domain crossing can correspond to a path between a source register and a destination register in the circuit design 301 where asynchronous clock signals drive the source register and the destination register, respectively. Due to the asynchronous nature of clock signals, the source register can generate an asynchronous signal that can violate the setup and hold requirements for the destination register, for example, causing the destination register to enter a metastable state. The circuit design 301 can include synchronization circuitry or synchronizers within the signal paths of the clock domain crossings, which can prevent propagation of metastable events to downstream logic. The static verification operations performed by the clock domain crossing check system 310 also can include analyzing the circuit design 301 and the design constraints 302 to identify violations associated with the clock domain crossings in the circuit design 301, and generating check results 303 describing the identified violations.

The design verification tool 300 can include a clock domain crossing assist system 320 that, in a block 402, can identify violations associated with clock domain crossing based on the static verification operations. Since violations determined by the static verification operations can correspond to errors in the circuit design 301 or based on a deficiency in the design constraints 302, in some embodiments, the clock domain crossing assist system 320 can utilize the identified violations to detect missing or incomplete constraints in the design constraints 302 and generate one or more violation-based constraints 305 for use in subsequently performed static verification operations on the circuit design 301 by the lock domain crossing check system 310. The clock domain crossing assist system 320 can include a violation report system 330 to generate a clock domain crossing assist report 304, which can correlate the violation-based constraints 305 to the violation(s) used by the clock domain crossing assist system 320 to generate the violation-based constraints 305. The clock domain crossing assist report 304 also can include groupings of clock domain crossing paths, groupings of clock signals or clock domains, consolidation of violations corresponding to a common cause, or the like.

The clock domain crossing assist system 320 can parse the check results 303 to identify the violations detected by the static verification operations performed by the clock domain crossing check system 310. The clock domain crossing assist system 320 can identify clock domain crossing information, such as different clock signals, clock domains, clock domain crossing paths, synchronization circuitry, or the like, in the circuit design 301 based, at least in part, on the check results 303. In some embodiments, the clock domain crossing assist system 320 also can correlate the identified violations to the identified clock domain crossing information.

The clock domain crossing assist system 320 can include a constraint system 321 that, in a block 403, can analyze the circuit design 301 and a first set of design constraints, such as design constraints 302, to determine at least one of the identified violations correspond to the first set of the design constraints. In some embodiments, the constraint system 321 can apply different types of heuristics to the parsed information from the check results 303 to determine whether a violation in the check results 303 corresponds to a missing or incomplete design constraint. The constraint system 321, in a block 404, can generate one or more violation-based constraints 305 based on the analysis of the circuit design 301 and the first set of the design constraints. For example, when the constraint system 321 determines at least one of the violations in the check results 303 corresponds to a missing or incomplete design constraint, the constraint system 321 can generate one or more violation-based constraints 305 corresponding to the missing or incomplete design constraint. By utilizing the check results 303 to identify deficiencies in the design constraints 302 and generating violation-based constraints 305 to at least partially satisfy those deficiencies, the clock domain crossing assist system 320 can reduce future violations found during static verification operations due to deficient design constraints.

The constraint system 321, in some embodiments, can include clock heuristics 322 to analyze the circuit design 301 and the design constraints 302 by grouping clock signals in the circuit design 301 into multiple asynchronous clock groups, and generate one or more violation-based constraints 305 based on the asynchronous clock groups and violations associated with the clock domain crossings in the circuit design 301. In some embodiments, the clock heuristics 322 can identify gated clock signals in the circuit design 301, for example, signals output of logic gates in the circuit design 301 that were generated with a parent clock signal in the circuit design 301, by analyzing clock trees in the circuit design 301. The clock heuristics 322 can correlate the gated clock signals to the parent clock signal used to generate the gated clock signals and, when the gated clock signals have a synchronous relationship with the parent clock signal, the clock heuristics 322 can group them into one of the asynchronous clock groups and generate one or more violation-based constraints 305 based on the grouping of the gated clock signals to their corresponding parent clock signals.

The clock heuristics 322 can further analyze the gated clock signals to determine whether any of the gated clock signals have logical equivalency with each other, which can allow the clock heuristics 322 to group them together and generate a violation-based constraint 305 based on the grouping of the gated clock signals. In some embodiments, the clock heuristics 322 can utilize the clock tree and a corresponding expression of the gated clock signals to determine the logical equivalency.

The clock heuristics 322 also can utilize an identification of clock domain crossings of the circuit design 301 in the check results 303 to determine when two clock domains in the check results 303 can be grouped together as synchronous clock domains using a violation-based constraint 305. In some embodiments, the clock heuristics 322 can determine clock domain pairs, for each of the clock domain crossings identified in the check results 303, and then determine to group the clock domains in at least one of the clock domain pairs together as synchronous clock domains based on a presence of synchronization circuitry utilized between the clock domains in the clock domain crossings. For example, when the circuit design 301 does not include any synchronization circuitry between two clock domains in the circuit design 301, the clock heuristics 322 can infer there was a lack of a design constraint indicating the two clock domains were synchronous.

The constraint system 321, in some embodiments, can include setup heuristics 323 to analyze the circuit design 301 and the design constraints 302 by grouping the clock domain crossings in the circuit design 301 based on a commonality of transmission registers for the clock domain crossings. The setup heuristics 323 can generate one or more violation-based constraints 305 based on a presence of synchronization circuitry utilized in the clock domain crossings for the groups. The setup heuristics 323, in some embodiments, can detect stable signals by grouping clock domain crossings in the circuit design 301 having the same transmission register and identifying the signals as candidates to be stable signals when none of the cross domain crossing paths from the transmission register include synchronization circuitry. The setup heuristics 323 can generate a violation-based constraint indicating the output of the transmission register corresponds to a stable signal.

The setup heuristics 323, in some embodiments, can detect common reset sources signals by identifying clock domain crossings in the circuit design 301 having registers with reset pins driven by asynchronous signals and grouping the clock domain crossings based on the identification. The setup heuristics 323 can consolidate the reset violations in the check results 303 associated with each grouping of the clock domain crossings into a single violation, for example, to be included in the clock domain crossing assist report 304.

The constraint system 321, in some embodiments, can include results heuristics 324 to analyze the circuit design 301 and the design constraints 302 to detect synchronizer enable signals, detect stable and mutually exclusive signals, detect gray-coded signals, detect other similarly waived violations, or the like. In some embodiments, the results heuristics 324 can analyze input signals received by a destination register of a clock domain crossing, and generate at least one of the violation-based constraints 305 to report the input signals as a possible enable signal or to gray-code the input signals as a synchronized convergence. For example, the results heuristics 324 can perform a pattern analysis on fan-in expressions to the input of destination registers of clock domain crossings to detect whether the destination registers receive enable signals to prevent the occurrences of metastability at the clock domain crossings. The results heuristics 324 also can analyze combinational logic driving synchronization circuitry in the clock domain crossing paths, and generate at least one of the violation-based constraints 305 based on which clock domain associated with the combinational logic. For example, the results heuristics 324 can add a violation-based constraint 305 corresponding to a stable signal or a mutually exclusive signal based on the clock domain of the signals associated with the combinational logic driving the synchronization circuitry.

The clock domain crossing check system 310, in a block 405, can re-perform the static verification operations on the circuit design 301 based on a second set of design constraints that include one or more of the violation-based constraints 305. The constraint system 321, in some embodiments, can implement the clock heuristics 322, the setup heuristics 323, and the results heuristics 324 iteratively, which can prompt the clock domain crossing check system 310 to re-perform the static verification operations on the circuit design 301 with the violation-based constraints 305 iteratively also. Embodiments of an iterative process of performing clock domain crossing checks and implementing the clock, setup, and results heuristics will be described below in greater detail with reference to FIGS. 5A-5D.

Figure 5C:
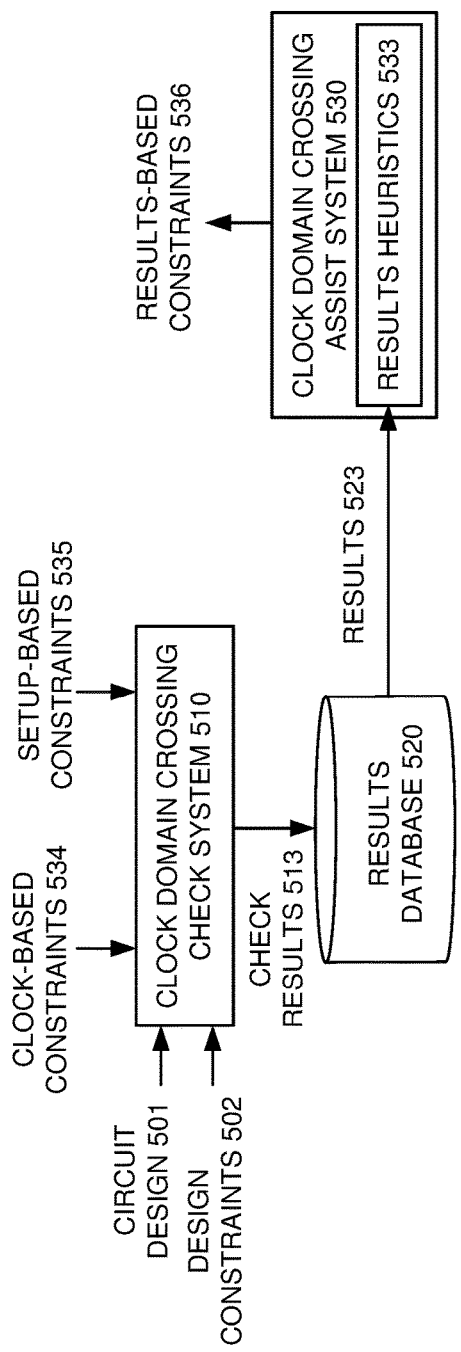

FIGS. 5A-5D illustrates an example iterative clock domain crossing verification process with violation-based constraints according to various embodiments. Referring to FIG. 5A, in a first iteration of the iterative clock domain crossing verification process, a clock domain crossing check system 510 can perform static verification operations on a circuit design 501 based, at least in part, on constraints 502 and generate check results 511, which can be similar to the performance of the static verification operations by the clock domain crossing check system 310 can perform static verification operations on a circuit design 301 based, at least in part, on constraints 302 to generate check results 303 described above with reference to FIG. 3.

The clock domain crossing check system 510 can store the check results 511 in a results database 520 for analysis by a clock domain crossing assist system 530. The clock domain crossing assist system 530 can implement clock heuristic 531 in the first iteration of the iterative clock domain crossing verification process. The clock domain crossing assist system 530 retrieve clock-based results 521 from the results database 520. The clock-based results 521 can correspond to the portions of the check results 511 for use by the clock heuristics 531 during the first iteration of the iterative clock domain crossing verification process. In some embodiments, the clock heuristic 531 can operate similar to the description of the clock heuristic 322 above with reference to FIG. 3, and can generate clock-based constraints 534 based on the clock-based results 521. The clock-based constraints 534 can correspond to new design constraints configured to cure deficiencies in the design constraints 502 prompting static verification violations related to clock domains in the circuit design 301.

Referring to FIG. 5B, in a second iteration of the iterative clock domain crossing verification process, the clock domain crossing check system 510 can perform static verification operations on the circuit design 501 based, at least in part, on the design constraints 502 and the clock-based constraints 534 generated by the clock domain crossing assist system 530 with reference to FIG. 5A. The clock domain crossing check system 510 can generate check results 512, which can differ from the results 511 in FIG. 5A, as the clock domain crossing check system 510 implemented the clock-based constraints 534 during the second iteration of the iterative clock domain crossing verification process.

The clock domain crossing check system 510 can store the check results 512 in the results database 520 for analysis by the clock domain crossing assist system 530. The clock domain crossing assist system 530 can implement setup heuristic 532 in the second iteration of the iterative clock domain crossing verification process. The clock domain crossing assist system 530 retrieve setup-based results 522 from the results database 520. The setup-based results 522 can correspond to the portions of the check results 512 for use by the setup heuristics 532 during the second iteration of the iterative clock domain crossing verification process. In some embodiments, the setup heuristic 532 can operate similar to the description of the setup heuristic 323 above with reference to FIG. 3, and can generate setup-based constraints 535 based on the setup-based results 522. The setup-based constraints 535 can correspond to new design constraints configured to cure additional deficiencies in the design constraints 502 prompting static verification violations related to a setup for static circuit design verification.

Referring to FIG. 5C, in a third iteration of the iterative clock domain crossing verification process, the clock domain crossing check system 510 can perform static verification operations on the circuit design 501 based, at least in part, on the design constraints 502, the clock-based constraints 534 generated by the clock domain crossing assist system 530 with reference to FIG. 5A, and the setup-based constraints 535 generated by the clock domain crossing assist system 530 with reference to FIG. 5B. The clock domain crossing check system 510 can generate check results 513, which can differ from the results 511 and 512 in FIGS. 5A and 5B, respectively, as the clock domain crossing check system 510 implemented the clock-based constraints 534 and the setup-based constraints 535 during the third iteration of the iterative clock domain crossing verification process.

The clock domain crossing check system 510 can store the check results 513 in the results database 520 for analysis by the clock domain crossing assist system 530. The clock domain crossing assist system 530 can implement results heuristic 533 in the third iteration of the iterative clock domain crossing verification process. The clock domain crossing assist system 530 retrieve results 523 from the results database 520. The results 523 can correspond to the portions of the check results 513 for use by the results heuristics 533 during the third iteration of the iterative clock domain crossing verification process. In some embodiments, the results heuristic 533 can operate similar to the description of the results heuristic 324 above with reference to FIG. 3, and can generate results-based constraints 536 based on the results 523. The results-based constraints 536 can correspond to new design constraints configured to cure additional deficiencies in the design constraints 502 prompting static verification violations.

Figure 5D:
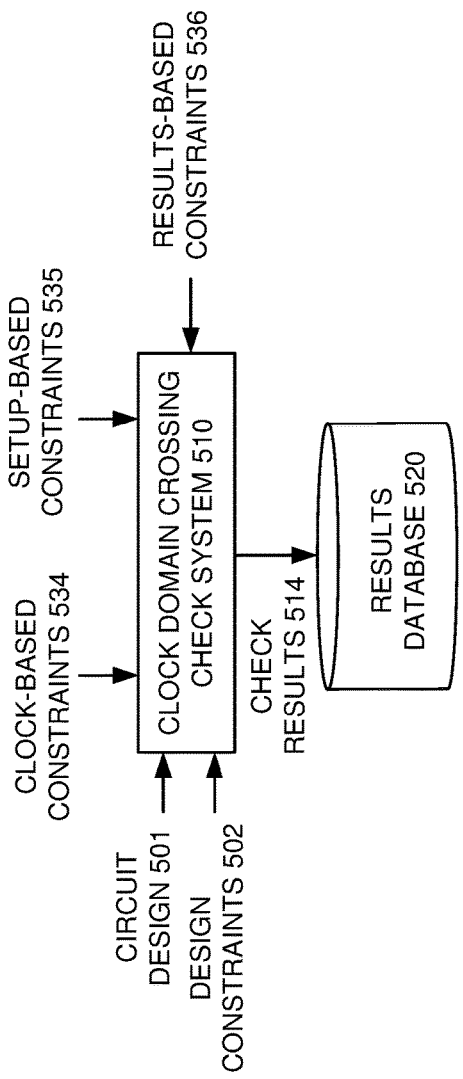

Referring to FIG. 5D, in a fourth iteration of the iterative clock domain crossing verification process, the clock domain crossing check system 510 can perform static verification operations on the circuit design 501 based, at least in part, on the design constraints 502, the clock-based constraints 534 generated by the clock domain crossing assist system 530 with reference to FIG. 5A, the setup-based constraints 535 generated by the clock domain crossing assist system 530 with reference to FIG. 5B, and the results-based constraints 536 generated by the clock domain crossing assist system 530 with reference to FIG. 5C. The clock domain crossing check system 510 can generate check results 514, which can differ from the results 511, 512, and 513 in FIGS. 5A, 5B, and 5C, respectively, as the clock domain crossing check system 510 implemented the clock-based constraints 534, the setup-based constraints 535, and the results-based constraints 536 during the fourth iteration of the iterative clock domain crossing verification process. The clock domain crossing check system 510 can store the check results 514 in the results database 520 for review by a design team. By iteratively performing static verification operations with differing sets of design constraints and iteratively analyzing check results with differing heuristics in the clock domain crossing assist system 530, the design verification tool can reduce or consolidate a number of violations due to missing or incomplete design constraints 502.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
identifying, by a computing system, one or more violations associated with clock domain crossings in a circuit design based, at least in part, on static verification operations performed on the circuit design with a set of design constraints characterizing portions of an electronic device described by the circuit design;
analyzing, by the computing system, the circuit design and the set of the design constraints by grouping clock signals in the circuit design into multiple asynchronous clock groups or by grouping the clock domain crossings in the circuit design based on a commonality of transmission registers for the clock domain crossings to determine at least one of the violations associated with the clock domain crossings in the circuit design corresponds to the set of the design constraints; and
generating, by the computing system, one or more additional design constraints to integrate into the set of the design constraints based on the asynchronous clock groups and the violations associated with the clock domain crossings in the circuit design or a presence of synchronizing circuitry utilized in the clock domain crossings for the groups and the violations associated with the clock domain crossings in the circuit design.

2. The method of claim 1, further comprising performing, by the computing system, static verification operations on the circuit design based, at least in part, on the set of the design constraints having been integrated with the additional design constraints.

3. The method of claim 1, further comprising consolidating the violations associated with at least one of the groups of the clock domain crossings into a single violation.

4. The method of claim 1, wherein analyzing the circuit design and the set of the design constraints further comprises analyzing input signals received by a reception register of a clock domain crossing, and wherein generating the one or more additional design constraints to report the input signals as a possible enable signal or to gray-code the input signals as a synchronized convergence.

5. The method of claim 1, wherein analyzing the circuit design and the set of the design constraints further comprises analyzing combinational logic driving synchronization circuitry in the clock domain crossing paths, and wherein generating the one or more additional design constraints based on which clock domain associated with the combinational logic.

6. A system comprising:
a memory device configured to store machine-readable instructions; and
a computing system including one or more processing devices, in response to executing the machine-readable instructions, configured to:
identify one or more violations associated with clock domain crossings in a circuit design based, at least in part, on static verification operations performed on the circuit design with a set of design constraints characterizing portions of an electronic device described by the circuit design;
analyze the circuit design and the set of the design constraints by grouping clock signals in the circuit design into multiple asynchronous clock groups or by grouping the clock domain crossings in the circuit design based on a commonality of transmission registers for the clock domain crossings to determine at least one of the violations associated with the clock domain crossings in the circuit design corresponds to the set of the design constraints; and
generate one or more additional design constraints to integrate into the set of the design constraints based on the asynchronous clock groups and the violations associated with the clock domain crossings in the circuit design or a presence of synchronizing circuitry utilized in the clock domain crossings for the groups and the violations associated with the clock domain crossings in the circuit design.

7. The system of claim 6, wherein the one or more processing devices, in response to executing the machine-readable instructions, are further configured to perform static verification operations on the circuit design based, at least in part, on the set of the design constraints having been integrated with the additional design constraints.

8. The system of claim 6, wherein the one or more processing devices, in response to executing the machine-readable instructions, are further configured to consolidate the violations associated with at least one of the groups of the clock domain crossings into a single violation.

9. The system of claim 6, wherein the one or more processing devices, in response to executing the machine-readable instructions, are further configured to:
analyze the circuit design and the set of the design constraints by analyzing input signals received by a reception register of a clock domain crossing, and
generate the one or more additional design constraints to report the input signals as a possible enable signal or to gray-code the input signals as a synchronized convergence.

10. An apparatus comprising at least one computer-readable memory device storing instructions configured to cause one or more processing devices to perform operations comprising:
- identifying, one or more violations associated with clock domain crossings in a circuit design based, at least in part, on static verification operations performed on the circuit design with a set of design constraints characterizing portions of an electronic device described by the circuit design;
- analyzing the circuit design and the set of the design constraints by grouping clock signals in the circuit design into multiple asynchronous clock groups or by grouping the clock domain crossings in the circuit design based on a commonality of transmission registers for the clock domain crossings to determine at least one of the violations associated with the clock domain crossings in the circuit design corresponds to the set of the design constraints; and
- generating one or more additional design constraints to integrate into the set of the design constraints based on the asynchronous clock groups and the violations associated with the clock domain crossings in the circuit design or a presence of synchronizing circuitry utilized in the clock domain crossings for the groups and the violations associated with the clock domain crossings in the circuit design.

11. The apparatus of claim 10, wherein the instructions are configured to cause the one or more processing devices to perform operations further comprising performing static verification operations on the circuit design based, at least in part, on the set of the design constraints having been integrated with the additional design constraints.

12. The apparatus of claim 10, wherein the instructions are configured to cause the one or more processing devices to perform operations further comprising consolidating the violations associated with at least one of the groups of the clock domain crossings into a single violation.

13. The apparatus of claim 12, wherein analyzing the circuit design and the set of the design constraints further comprises analyzing input signals received by a reception register of a clock domain crossing, and wherein generating the one or more additional design constraints to report the input signals as a possible enable signal or to gray-code the input signals as a synchronized convergence.

14. The apparatus of claim 10, wherein analyzing the circuit design and the set of the design constraints further comprises analyzing combinational logic driving synchronization circuitry in the clock domain crossing paths, and wherein generating the one or more additional design constraints based on which clock domain associated with the combinational logic.

* * * * *